(12) United States Patent
Jun

(10) Patent No.: US 10,674,160 B2
(45) Date of Patent: Jun. 2, 2020

(54) PARALLEL VIDEO ENCODING DEVICE AND ENCODER CONFIGURED TO OPERATE IN PARALLEL WITH ANOTHER ENCODER

(71) Applicant: Samsung Electronics Co., Ltd., Suwon-si, Gyeonggi-do (KR)

(72) Inventor: Sung Ho Jun, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/962,217

(22) Filed: Apr. 25, 2018

(65) Prior Publication Data

US 2019/0116362 A1  Apr. 18, 2019

(30) Foreign Application Priority Data

Oct. 16, 2017  (KR) .................. 10-2017-0133921

(51) Int. Cl.
*H04N 19/52* (2014.01)
*H04N 19/176* (2014.01)
*H04N 19/61* (2014.01)
*G06F 1/32* (2019.01)
*G06T 1/20* (2006.01)
*H04N 19/159* (2014.01)
*H04N 19/172* (2014.01)
*H04N 19/196* (2014.01)
(Continued)

(52) U.S. Cl.
CPC ......... *H04N 19/159* (2014.11); *H04N 19/154* (2014.11); *H04N 19/172* (2014.11); *H04N 19/197* (2014.11); *H04N 19/42* (2014.11); *H04N 19/503* (2014.11); *H04N 19/52* (2014.11); *H04N 19/567* (2014.11)

(58) Field of Classification Search
CPC .... H04N 19/172; H04N 19/61; H04N 19/436; H04N 19/194; H04N 19/15
See application file for complete search history.

(56) References Cited

U.S. PATENT DOCUMENTS 5,978,029 A    11/1999 Boice et al.
6,356,589 B1 *  3/2002 Gebler ............... H04N 19/30
                                                  375/240.1
(Continued)

FOREIGN PATENT DOCUMENTS

KR    2015/0035318 A    4/2015

*Primary Examiner* — Alison Slater
(74) *Attorney, Agent, or Firm* — Harness, Dickey & Pierce P.L.C.

(57) ABSTRACT

A video encoding device is provided. The video encoding device includes a first encoder including a prediction module, which performs an intra prediction operation or an inter prediction operation on a plurality of first blocks included in a first frame, and a second encoder encoding a second frame, which is different from the first frame, and not including the prediction module, wherein if the inter prediction operation is performed on the first blocks, the prediction module transmits first information regarding a motion estimation operation to the second encoder, and the second encoder includes a prediction block generation module, which receives the first information and generates a prediction block by performing a motion compensation operation on a plurality of second blocks included in the second frame based on the first information.

19 Claims, 8 Drawing Sheets

(51) Int. Cl.
*H04N 19/567* (2014.01)
*H04N 19/154* (2014.01)
*H04N 19/42* (2014.01)
*H04N 19/503* (2014.01)

(56) References Cited

U.S. PATENT DOCUMENTS

| | | | |
|---|---|---|---|
| 8,681,858 B2 | 3/2014 | Wang | |
| 8,948,529 B1 | 2/2015 | Maaninen | |
| 9,204,173 B2 | 12/2015 | Gomila et al. | |
| 9,363,473 B2 | 6/2016 | Zhao et al. | |
| 2008/0152014 A1* | 6/2008 | Schreier | H04N 19/172 |
| | | | 375/240.21 |
| 2010/0189179 A1* | 7/2010 | Gu | H04N 19/105 |
| | | | 375/240.16 |
| 2010/0246668 A1* | 9/2010 | Rintaluoma | H04N 19/172 |
| | | | 375/240.02 |
| 2011/0150074 A1 | 6/2011 | Wang et al. | |
| 2013/0259137 A1* | 10/2013 | Kuusela | H04N 19/423 |
| | | | 375/240.24 |
| 2016/0156925 A1* | 6/2016 | Kim | H04N 19/57 |
| | | | 375/240.08 |
| 2018/0062907 A1* | 3/2018 | Meduri | H04L 69/14 |
| 2018/0286101 A1* | 10/2018 | Tanner | G06T 15/005 |

\* cited by examiner

PARALLEL VIDEO ENCODING DEVICE AND ENCODER CONFIGURED TO OPERATE IN PARALLEL WITH ANOTHER ENCODER

CROSS-REFERENCE TO RELATED APPLICATION

This application claims priority to Korean Patent Application No. 10-2017-0133921, filed on Oct. 16, 2017, and all the benefits accruing therefrom under 35 U.S.C. § 119, the disclosure of which is incorporated herein by reference in its entirety.

BACKGROUND

1. Field

Example embodiments relate to a video encoding device and/or an encoder.

2. Description of the Related Art

The demand for high-resolution, high-quality images such as high definition (HD) and ultra-high definition (UHD) images has increased, and high-performance video compression techniques for processing such high-resolution, high-quality images have been used.

Recently, mobile devices such as mobile phones, smart phones, and the like have been widely used, and research has been conducted into ways to efficiently compress high-resolution, high-quality images even in mobile devices having a small size and having a limited environment of use such as the use of batteries.

Also, there has been an increasing tendency to encode images at high frame rates or frames per second (FPS). However, currently, images may be encoded only at limited frame rates, and it is difficult to encode images at high frame rates by using a single encoder.

By using a plurality of encoders, images can be encoded at high frame rates. However, when multiple encoders are used, the size of an entire encoding device increases, and the size of a device having the encoding device embedded therein also increases.

SUMMARY

Example embodiments of the present disclosure provide encoding an image with the use of a plurality of encoders while minimizing the space occupied by the plurality of encoders.

Example embodiments of the present disclosure provide encoding an image with the use of a full encoder and a partial encoder while minimizing the deterioration of the quality of the image.

However, Example embodiments of the present disclosure are not restricted to those set forth herein. The above and other Example embodiments of the present disclosure will become more apparent to one of ordinary skill in the art to which the present disclosure pertains by referencing the detailed description of some of the example embodiments given below.

According to an example embodiment of the present disclosure, a video encoding device may include a first encoder including prediction circuitry, the prediction circuitry configured to, perform one or more of an intra prediction operation and an inter prediction operation on a plurality of first blocks included in a first frame, and transmit first information regarding a motion estimation operation, if the prediction circuitry performs the inter prediction operation on the first blocks; and a second encoder including prediction block generation circuitry, the prediction block generation circuitry configured to, receive the first information from the first encoder, and generate a prediction block by performing a motion compensation operation on a plurality of second blocks included in a second frame based on the first information, the second frame being a different frame from the first frame.

According to an example embodiment of the present disclosure, an encoder may be configured to encode a first frame without having prediction circuitry to perform one or more of intra prediction and inter prediction. The encoder may include prediction block generation circuitry configured to receive first information and second information from a first encoder, the first information being associated with a motion estimation operation and the second information being associated with an intra prediction operation, the first encoder being different from the encoder, and to generate a prediction block; and post-processing circuitry configured to detect a quality deterioration based on a reconstructed frame and the first frame, the reconstructed frame being obtained by inversely quantizing data encoded by the encoder.

According to an example embodiment of the present disclosure, a video encoding device may include a first encoder; a second encoder, the second encoder being different from the first encoder; and a processor configured to, allocate a first frame and a second frame to a first encoder and a second encoder, respectively, the first frame and the second frame being different ones of a plurality of frames included in an input image such that the second frame is a frame subsequent to the first frame, and if a quality deterioration is detected from an image encoded by the second encoder, the processor is configured to, reallocate the second frame to the first encoder after the first encoder completes encoding of the first frame, and allocate a third frame to the second encoder, the third frame being a frame subsequent to the second frame.

Other features and example embodiments may be apparent from the following detailed description, the drawings, and the claims.

BRIEF DESCRIPTION OF THE DRAWINGS

The above and other example embodiments and features of the present disclosure will become more apparent by describing in detail example embodiments thereof with reference to the attached drawings, in which.

DETAILED DESCRIPTION

Figure 1:
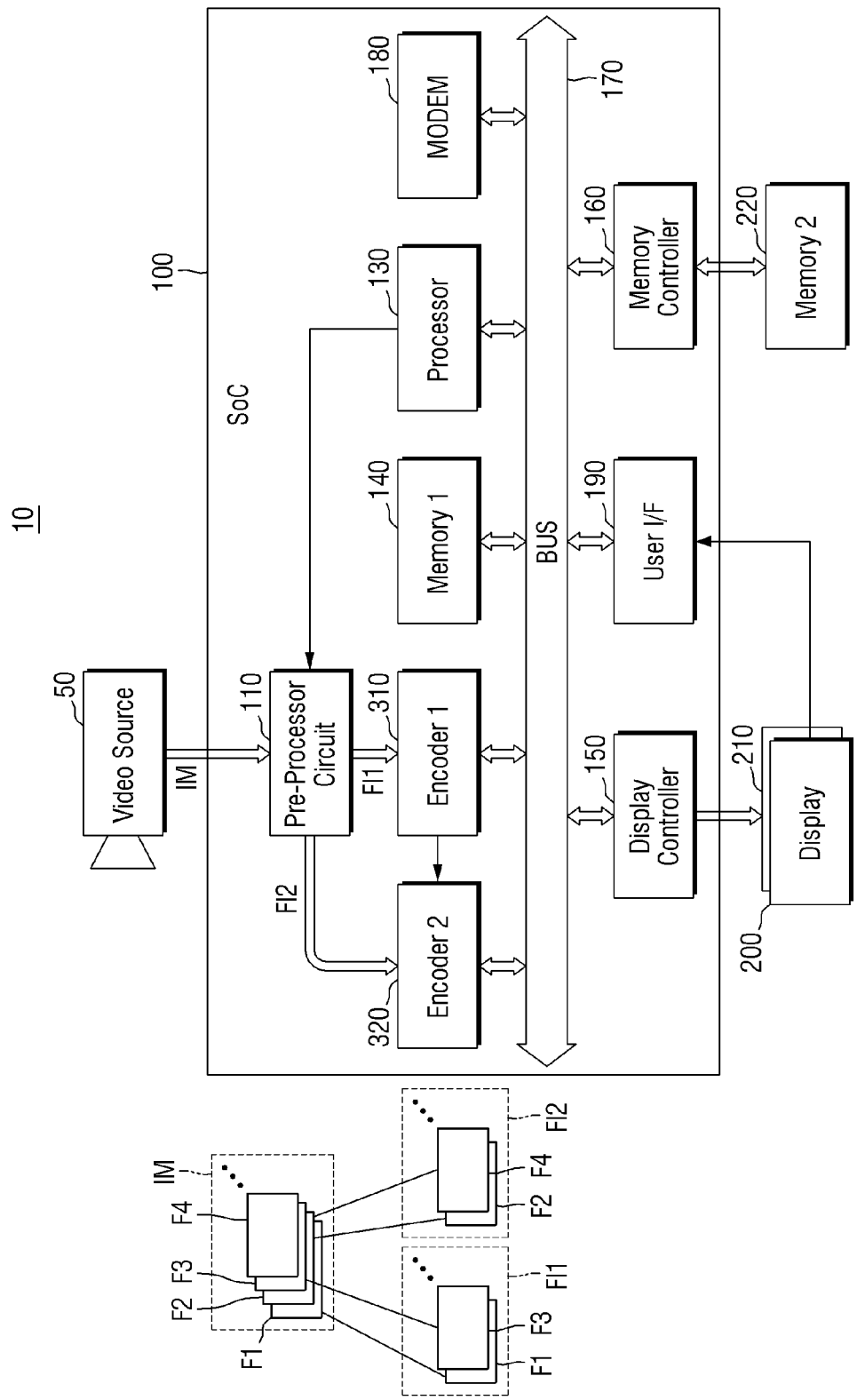
FIG. 1 is a block diagram illustrating a video encoding system according to some example embodiments of the present disclosure.

FIG. 1 is a block diagram illustrating a video encoding system according to some example embodiments of the present disclosure.

Referring to FIG. 1, a video encoding system 10 may include various devices capable of capturing a video, processing the video, and displaying, storing, or transmitting the processed video.

For example, the video encoding system 10 may be implemented as one of a television (TV), a digital TV (DTV), an Internet protocol TV (IPTV), a personal computer (PC), a desktop computer, a laptop computer, a computer workstation, a tablet PC, a video game platform/console, a server, and a mobile computing device. The mobile computing device may be implemented as a mobile phone, a smart phone, an enterprise digital assistant (EDA), a digital still camera, a digital video camera, a portable multimedia player (PMP), a personal/portable navigation device (PND), a mobile Internet device (MID), a wearable computer, an Internet of things (IOT) device, an Internet of everything (IOE) device, or an electronic book (e-book). However, example embodiments are not limited thereto.

The video encoding system 10 may include a video source 50, a video encoding device 100, a display 200, an input device 210, and a second memory 220 ("Memory 2").

The video source 50, the video encoding device 100, the display 200, the input device 210, and the second memory 220 are not all necessarily essential for realizing the video encoding system 10, and the video encoding system 10 may include more elements or fewer elements than what is illustrated in FIG. 1.

The video encoding device 100 may be implemented as a system-on-chip (SoC).

The video source 50 may be implemented as a camera equipped with, for example, a charge-coupled device (CCD) or complementary metal-oxide-semiconductor (CMOS) image sensor.

The video source 50 may generate first data IM regarding a subject by capturing an image of the subject and may provide the first data IM to the video encoding device 100.

The first data IM may be still image data or moving image data. In some example embodiments, the video source 50 may be included in a host. In this case, the first data IM may be image data provided by the host.

The video encoding device 100 may control the general operation of the video encoding system 10.

For example, the video encoding device 100 may include an integrated circuit (IC), a mother board, an application processor (AP), and/or a mobile AP capable of performing operations according to some example embodiments of the present disclosure.

The video encoding device 100 may process the first data IM output by the video source 50 and may display the processed data via the display 200, store the processed data in the second memory 220, and/or transmit the processed data to another data processing system.

The video encoding apparatus 100 may include a pre-processor circuit 110, a first encoder 310 ("Encoder 1"), a second encoder 320 ("Encoder 2"), a processor 130, a first memory 140 ("Memory 1"), a display controller 150, a memory controller 160, a bus 170, a modem 180, and a user interface (I/F) 190.

The pre-processor circuit 110, the first encoder 310, the second encoder 320, the processor 130, the first memory 140, the display controller 150, the memory controller 160, the bus 170, the modem 180, and the user I/F 190 are not all necessarily essential for realizing the video encoding device 100, and the video encoding device 100 may include more elements or fewer elements than what is illustrated in FIG. 1.

The first encoder 310, the second encoder 320, the processor 130, the first memory 140, the display controller 150, the memory controller 160, the modem 180, and the user I/F 190 may exchange data with one another via the bus 170.

For example, the bus 170 may be implemented as at least one of a peripheral component interconnect (PCI) bus, a PCI express (PCIe) bus, an advanced microcontroller bus architecture (AMBA), an advanced high performance bus (AHB), an advanced peripheral bus (APB), an advanced extensible interface (AXI) bus, and a combination thereof, but the present disclosure is not limited thereto.

The pre-processor circuit 110 may include, for example, an image signal processor (ISP). The ISP may convert the first data IM having a first data format into second data FI1 and third data FI2.

For example, the first data IM may be data having a Bayer pattern, and the second data FI1 and the third data FI2 may be YUV data. However, example embodiments are not limited to this example.

The pre-processor circuit 110 may receive the first data IM output by the video source 50. The pre-processor circuit 110 may process the first data IM and may provide the second data FI1 and the third data FI2, which are obtained by processing the first data IM, to the first encoder 310 and the second encoder 320, respectively.

In an environment where the video encoding device 100 is driven, the first data IM, the second data FI1, and the third data FI2 may be provided in units of, for example, frames (or pictures).

For example, the first data IM may be a group of data having a plurality of first through fourth frames F1, F2, F3, and F4. The second frame F2 may be the frame subsequent to the first frame F1. The third frame F3 may be the frame subsequent to the second frame F2. The fourth frame F4 may be the frame subsequent to the third frame F3.

The second data FI1 transmitted to the first encoder 310 may be a group of data including data regarding odd-numbered frames among the first through fourth frames F1 through F4, e.g., the first and third frames F1 and F3. The third data FI2 transmitted to the second encoder 320 may be a group of data including data regarding even-numbered frames among the first through fourth frames F1 through F4, e.g., the second and fourth frames F2 and F4.

The pre-processor circuit 110 is illustrated in FIG. 1 as being implemented on the inside of the video encoding device 100, but example embodiments are not limited thereto. That is, the pre-processor circuit 110 may be implemented on the outside of the video encoding device 100.

For example, the first encoder 310 may encode the odd-numbered frames, e.g., the first and third frames F1 and F3. In this example, the second encoder 320 may encode the second frame F2, which is the frame subsequent to the first frame F1. However, example embodiments are not limited to this example. That is, alternatively, if the even-numbered frames, e.g., the second and fourth frames F2 and F4, are allocated or reallocated to the first encoder 310, the first encoder 310 may encode the second and fourth frames F2 and F4.

The first encoder 310 may transmit at least one of first information, second information, and third information, which are all acquired in the process of encoding each of a plurality of blocks included in the first frame F1 (or the third frame F3) and are regarding motion estimation, regarding intra prediction, and regarding quantization parameter values determined by a rate control module (not illustrated), respectively, to the second encoder 320.

The second encoder 320 may not perform at least one of motion prediction, intra prediction, and the adjustment of quantization parameter values during the encoding of each of a plurality of blocks included in the second frame F2. Instead, the second encoder 320 may receive at least one of the first information, the second information, and the third information and may generate a prediction block for each of the plurality of blocks included in the second frame F2.

In some example embodiments, the first encoder 310 may be a full encoder, and the second encoder 320 may be a partial encoder. That is, some of the elements of the first encoder 310 may not be provided in the second encoder 320. For example, the first encoder 310 may include processing circuitry to perform the functions of a rate control module, a motion estimation module and/or an intra prediction module, while the second encoder 320 may not include the processing circuitry that performs the functions of at least one of a rate control module, a motion estimation module, and an intra prediction module.

The first and second encoders 310 and 320 may use a video encoding format such as Joint Picture Expert Group (JPEG), Motion Picture Expert Group (MPEG), MPEG-2, MPEG-4, VC-1, H.264, H.265, or high efficiency video coding (HEVC), but example embodiments are not limited thereto.

The processor 130 may control the operation of the video encoding device 100.

The processor 130 may include processing circuitry and a memory (not shown).

The memory (not shown) may include at least one of a volatile memory, nonvolatile memory, random access memory (RAM), a flash memory, a hard disk drive, and an optical disk drive.

The processing circuitry may be, but not limited to, a processor, Central Processing Unit (CPU), a controller, an arithmetic logic unit (ALU), a digital signal processor, a microcomputer, a field programmable gate array (FPGA), an Application Specific Integrated Circuit (ASIC), a System-on-Chip (SoC), a programmable logic unit, a microprocessor, or any other device capable of performing operations in a defined manner.

The processor 130 may receive user input in order to run one or more applications (for example, software applications). Some of the applications run by the processor 130 may be video call applications. Also, the applications run by the processor 130 may include an operating system (OS), a word processor application, a media player application, a video game application, and/or a graphic user interface (GUI) application, but the present disclosure is not limited thereto.

The processor 130 may be configured, through a layout design or execution of computer readable instructions stored in the memory (not shown), as a special purpose computer to control the pre-processor circuit 110 to allocate the odd-numbered frames, e.g., the first and third frames F1 and F3, to the first encoder 310 and the even-numbered frames, e.g., the second and fourth frames F2 and F4, to the second encoder 320. That is, the processor 130 may determine which frames are to be allocated to the first and second encoders 310 and 320. Therefore, the processing circuitry may improve the functioning of the video encoding apparatus 100 itself by correcting a deterioration in image quality of a frame by reallocating the frame from the second encoder 320 to the first encoder 310 thus allowing the frame to be re-encoded by the first encoder 310 having the circuitry corresponding to the prediction module.

The processor 130 may allocate frame data to the first and second encoders 310 and 320 in various manners. For example, the processor 130 may allocate the even-numbered frames (e.g., the second and fourth frames F2 and F4) to the first encoder 310 and the odd-numbered frames (e.g., the first and third frames F1 and F3) to the second encoder 320.

In some example embodiments, if a quality deterioration is detected from a frame obtained by decoding an image encoded by the second encoder 320, the processor 130 may reallocate the frame obtained through decoding by the second encoder 320 to the first encoder 310 and may allocate the frame subsequent to the frame obtained through decoding by the second encoder 320 to the second encoder 320. In this case, the frames allocated to the first and second encoders 310 and 320 may be changed.

For example, assuming that the first encoder 310 encodes the first frame F1 and the second encoder 320 encodes the second frame F2, the processor 130 may reallocate the second frame F2 to the first encoder 310 if a quality deterioration is detected from data obtained by decoding the encoded second frame. Then, the processor 130 may allocate the frame subsequent to the second frame F2, e.g., the third frame F3, to the second encoder 320.

The first memory 140 may transmit information regarding current frames of the second data FI1 and the third data FI2 that are currently being encoded by the first and second encoders 310 and 320 to the first and second encoders 310 and 320 under the control of the memory controller 160.

The memory controller 160 may write data encoded by the first and second encoders 310 and 320 or data (for example, a bit stream) output by the processor 130 to the second memory 220 under the control of the first encoder 310, the second encoder 320, or the processor 130.

The first memory 140 may be implemented as a volatile memory, but example embodiments are not limited thereto. The volatile memory may be provided as a random access memory (RAM), a static RAM (SRAM), a dynamic RAM (DRAM), a synchronous DRAM (SDRAM), a thyristor RAM (T-RAM), a zero capacitor RAM (Z-RAM), or a twin transistor RAM (TTRAM). Alternatively, the first memory 140 may be implemented as a nonvolatile memory.

The second memory 220 may be implemented as a nonvolatile memory, but the example embodiments are not limited thereto. The nonvolatile memory may be provided as an electrically erasable programmable read-only memory (EEPROM), a flash memory, a magnetic RAM (MRAM), a spin-transfer torque MRAM, a ferroelectric RAM (Fe-RAM), a phase-change RAM (PRAM), or a resistive RAM (RRAM). Also, the nonvolatile memory may be provided as a multimedia card (MMC), an embedded MMC (eMMC), a universal flash storage (UFS), a solid state drive or disk (SSD), a universal serial bus (USB) flash drive, or a hard disk drive (HDD). Alternatively, the second memory 220 may be implemented as a volatile memory.

FIG. 1 illustrates an example in which the second memory 220 is provided on the outside of the video encoding device 100, but example embodiments are not limited thereto. In another example, the second memory 220 may be provided on the inside of the video encoding device 100.

The display controller 150 may transmit data output by the encoder 120 or the processor 130 to the display 200. The display 200 may be implemented as a monitor, a TV monitor, a projection device, a thin film transistor-liquid crystal display (TFT-LCD), a light-emitting diode (LED) display, an organic LED (OLED) display, an active-matrix OLED (AMOLED) display, or a flexible display.

For example, the display controller 150 may transmit data to the display 200 via a mobile industry processor interface (MIPI) display serial interface (DSI).

The input device 210 may receive user input from a user and may transmit an input signal to the user I/F 190 in response to the received user input.

The input device 210 may be implemented as a touch panel, a touch screen, a voice recognizer, a touch pen, a keyboard, a mouse, or a track point, but example embodiments are not limited thereto. For example, in a case where the input device 210 is a touch screen, the input device 210 may include a touch panel and a touch panel controller. The input device 210 may be connected to the display 200 and may be implemented separately from the display 200.

The input device 210 may transmit the input signal to the user I/F 190.

The user I/F 190 may receive the input signal from the input device 210 and may transmit data generated by the input signal to the processor 130.

The modem 180 may output data encoded by the encoder 120 or the processor 130 to the outside using a wireless communication technique. The modem 180 may employ a wireless communication technique such as, for example, WiFi, Wibro, 3G wireless communication, Long Term Evolution (LTE), Long Term Evolution-Advanced (LTE-A), or broadband LTE-A, but example embodiments are not limited thereto.

Figure 2:
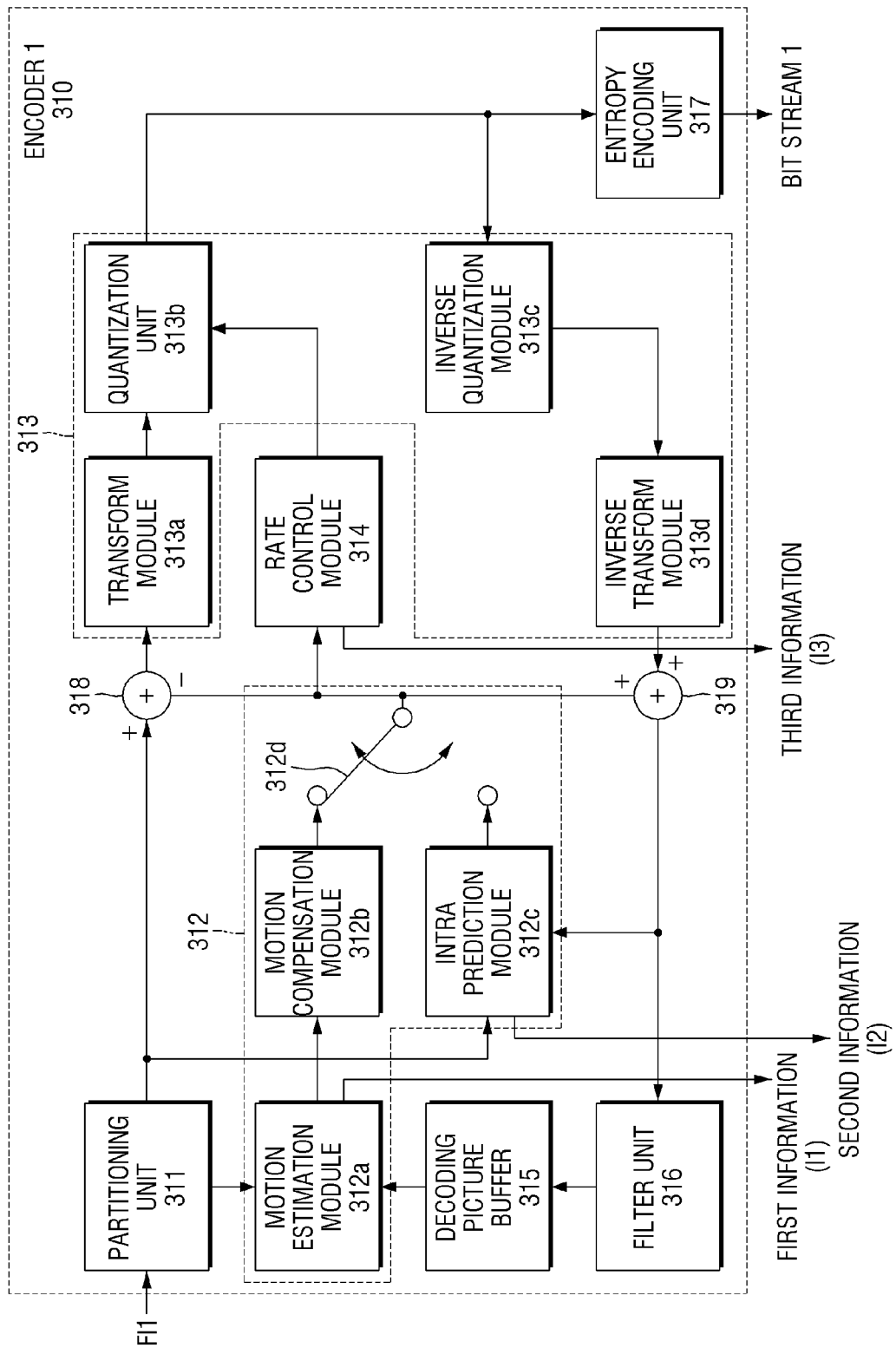
FIG. 2 is a block diagram illustrating an example of a first encoder included in the video encoding system of FIG. 1.

FIG. 2 is a block diagram illustrating an example of the first encoder included in the video decoding device of FIG. 1.

Referring to FIG. 2, the first encoder 310 may be a field programmable gate array (FPGA), an Application Specific Integrated Circuit (ASIC), a System-on-Chip (SoC) that includes processing circuitry corresponding to a partitioning unit 311, a prediction module 312, a compression module 313, a rate control module 314, a decoding picture buffer (DPB) 315, a filter unit 316, an entropy encoding unit 317, a subtractor 318, and an adder 319.

The elements illustrated in FIG. 2 are not all necessarily essential for realizing the first encoder 310, and the first encoder 310 may include more elements or fewer elements than what is illustrated in FIG. 2.

The partitioning unit 311 may partition a current frame of the second data FI1 that is currently being encoded, for example, the first frame F1, into a plurality of blocks.

The prediction module 312 may perform intra prediction or inter prediction on the first frame F1.

Intra prediction is a mode of prediction that performs prediction with reference only to the current frame, and inter prediction is a mode of prediction that performs prediction with reference not only to the current frame, but also to other frames.

The prediction module 312 may include a motion estimation module 312a, a motion compensation module 312b, an intra prediction module 312c, and a switch 312d.

The motion estimation module 312a may divide the current frame into a suitable number of blocks of a suitable size so as to produce the least distortion and minimize the number of bits generated. The motion estimation module 312a may select a mode of motion estimation that produces the least distortion and the smallest number of bits from among a variety of modes of motion estimation (e.g., normal mode, merge mode, etc.). The motion estimation module 312a may obtain a motion vector by searching a reference image stored in the DPB 315 for an area that best matches a block input to the prediction module 312.

The motion compensation module 312b may generate a prediction block by performing motion compensation using the motion vector obtained by the motion estimation module 312a and the reference image stored in the DPB 315.

The intra prediction module 312c may divide the current frame into a suitable number of blocks of a suitable size so as to produce the least distortion and minimize the number of bits generated. The intra prediction module 312c may select a mode of intra prediction that produces the least distortion and the smallest number of bits from among a variety of modes of intra prediction (e.g., DC mode and planar mode). The intra prediction module 312c may generate a prediction block by performing spatial prediction using the pixel values of already encoded blocks near a current block of the current frame that is currently being encoded.

After performing both intra prediction and inter prediction, the prediction module 312 may decide whether to perform intra prediction or inter prediction using a cost value J calculated by Equation (1):

$$J=D+A*R \qquad (1)$$

where D denotes the distortion index of an encoded image, A denotes a constant value proportional to a quantization parameter value, and R denotes the number of bits generated by intra prediction or inter prediction.

The prediction module 312 may use the switch 312d to perform inter prediction if a determination is made, based on the cost value J, that it is appropriate to perform inter prediction. The prediction module 312 may use the switch 312d to perform intra prediction if a determination is made, based on the cost value J, that it is appropriate to perform intra prediction.

In some example embodiments, in a case where inter prediction is performed in the first encoder 310, the first encoder 310 may transmit first information I1 regarding motion estimation, including at least one of information on blocks that have been subjected to motion estimation (for example, the size and number of blocks that have been subjected to motion estimation), information on a motion estimation mode used, information on a reference frame, and motion vector information, to the second encoder 320.

In some example embodiments, in a case where intra prediction is performed in the first encoder 310, the first encoder 310 may transmit second information I2 regarding intra prediction, including at least one of information on blocks that have been subjected to intra prediction (for example, the size and number of blocks that have been subjected to intra prediction), information on an intra prediction mode used, and information on a reference block, to the second encoder 320.

The subtractor 318 may generate a residual block based on the difference between the current block of the current frame and the prediction block generated by the prediction module 312. The residual block may be a block indicating the difference between the current block of the current frame and the prediction block.

The rate control module 314 may control the quantization parameter value of each of a plurality of blocks included in the current frame using the prediction block.

In some example embodiments, the first encoder 310 may transmit third information I3 regarding quantization parameter values determined by the rate control module 314 to the second encoder 320.

The compression module 313 may include a transform module 313a, a quantization unit 313b, an inverse quantization module 313c, and an inverse transform module 313d.

The transform module 313a may form block data transformed from the residual block. The transform module 313a may use discrete cosine transform (DCT) or wavelet transform. Transform coefficients generated by the transform module 313a may be transmitted to the quantization unit 313b.

The quantization unit 313b may quantize the transform coefficients in accordance with the quantization parameter values determined by the rate control module 314 and may output the quantized coefficients. The quantization unit 313b may reduce the number of bits by quantizing the transform coefficients. In this process, the rate control module 314 may adjust the degree of quantization by adjusting the quantization parameter values.

The quantized coefficients may be inversely quantized by the inverse quantization module 313c and may be inversely transformed by the inverse transform module 313d. The inversely quantized and inversely transformed coefficients may be added to the prediction block by the adder 319, thereby generating reconstructed blocks.

The reconstructed blocks may be filtered through the filter unit 316. The filter unit 316 may apply at least one of a deblocking filter, a sample adaptive offset (SAO) filter, and an adaptive loop filter (ALF) to the reconstructed blocks. The reconstructed blocks filtered through the filter unit 316 may be stored in the DPB 315.

The entropy encoding unit 317 may entropy-encode symbols according to a probability distribution based on values calculated by the quantization unit 313b or coding parameter values calculated during encoding and may thus output a first bit stream "BIT STREAM 1". Entropy encoding is a method of receiving symbols having various values and expressing the symbols as a decodable binary sequence while eliminating statistical redundancy.

Symbols may refer to syntax elements to be coded, coding parameters, or residual blocks. The coding parameters, which are parameters required for encoding and decoding, may include not only information encoded by an encoding device and transferred to a decoding device, such as syntax elements, but also information to be inferred during encoding or decoding, and may be information necessary for encoding or decoding an image. Examples of the coding parameters include values or statistics such as an intra/inter prediction mode, motion vectors, reference picture indexes, coding block patterns, the presence or absence of residual blocks, transform coefficients, quantized transform coefficients, quantization parameter values, block sizes, and block partition information.

When entropy encoding is applied, the size of a bit stream for symbols to be encoded can be reduced by allocating a small number of bits to symbols having a high probability of occurrence and a large number of bits to symbols having a low probability of occurrence. Accordingly, the compression performance of video encoding can be enhanced through entropy encoding.

For entropy encoding, a coding method such as exponential Golomb, context-adaptive variable length coding (CAVLC), or context-adaptive binary arithmetic coding (CABAC) may be used. For example, a table for performing entropy encoding, such as a variable length coding/code (VLC) table, may be stored in the entropy encoding unit 317, and the entropy encoding unit 317 may perform entropy encoding using the stored VLC table. Also, the entropy encoding unit 317 may derive a binarization method of a target symbol and a probability model of a target symbol/bin and may then perform entropy encoding using the derived binarization method or probability model.

Figure 3:
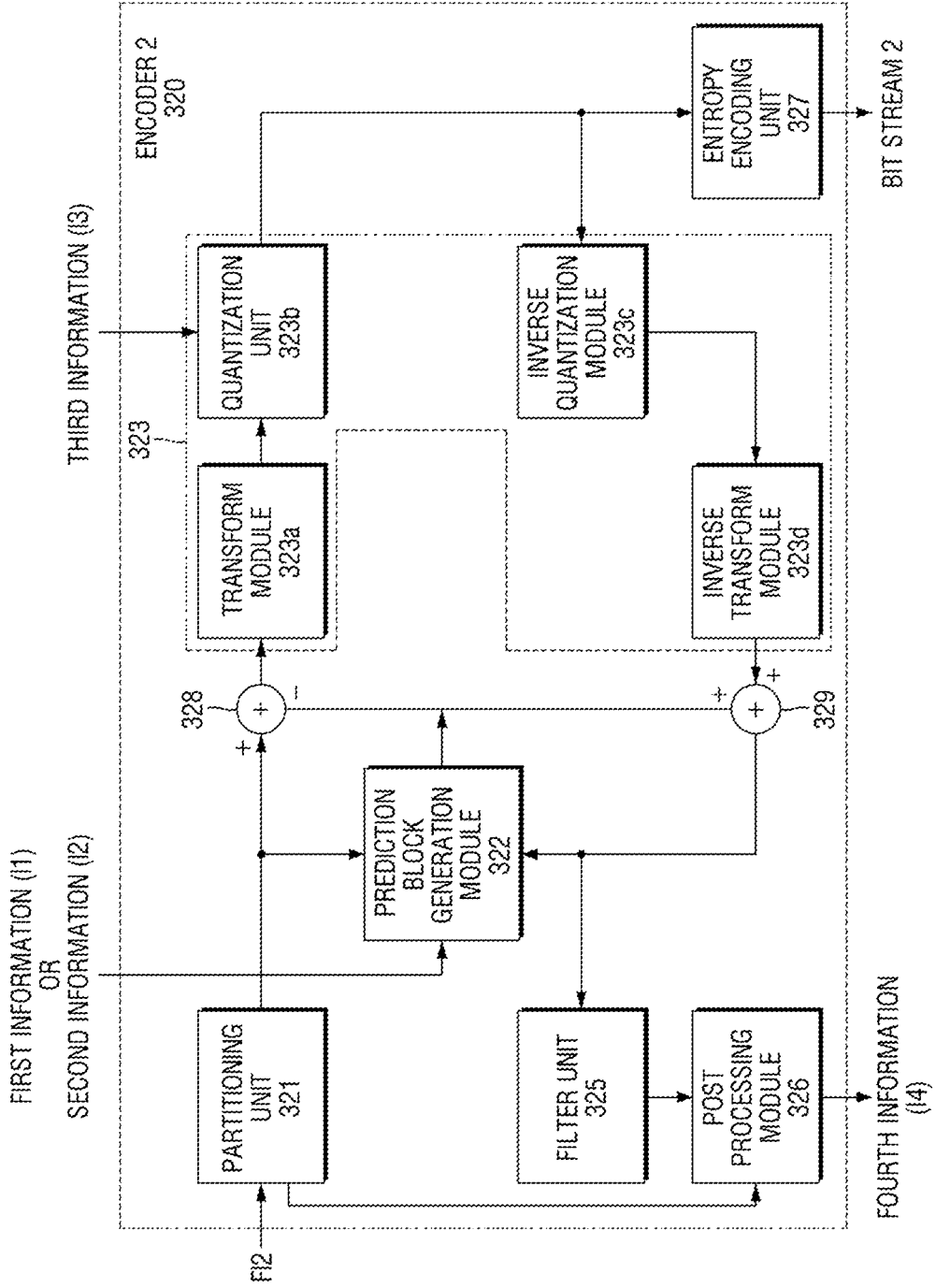
FIG. 3 is a block diagram illustrating an example of a second encoder included in the video encoding system of FIG. 1.
Figure 4:
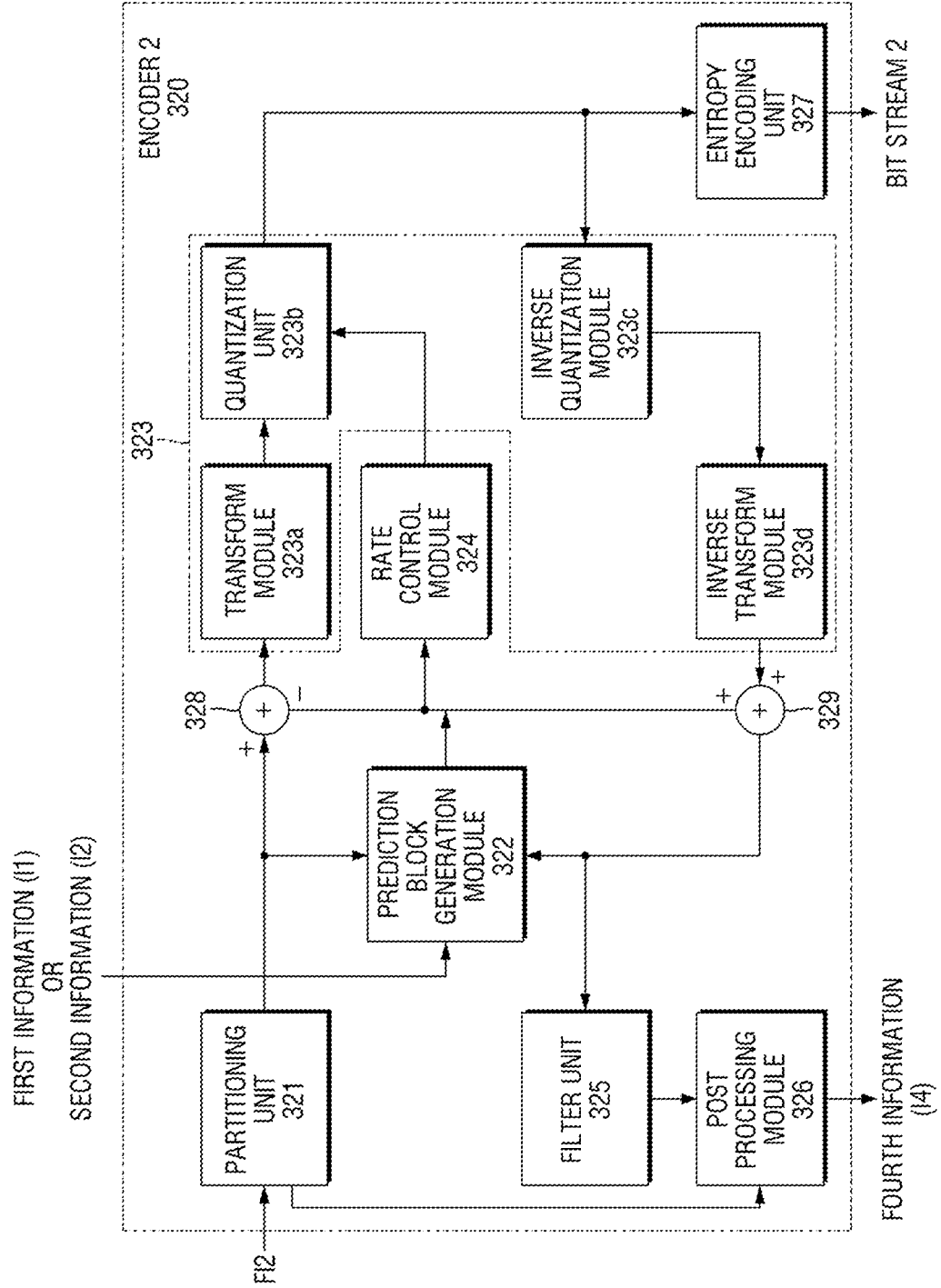
FIG. 4 is a block diagram illustrating another example of the second encoder included in the video encoding system of FIG. 1.
Figure 5:
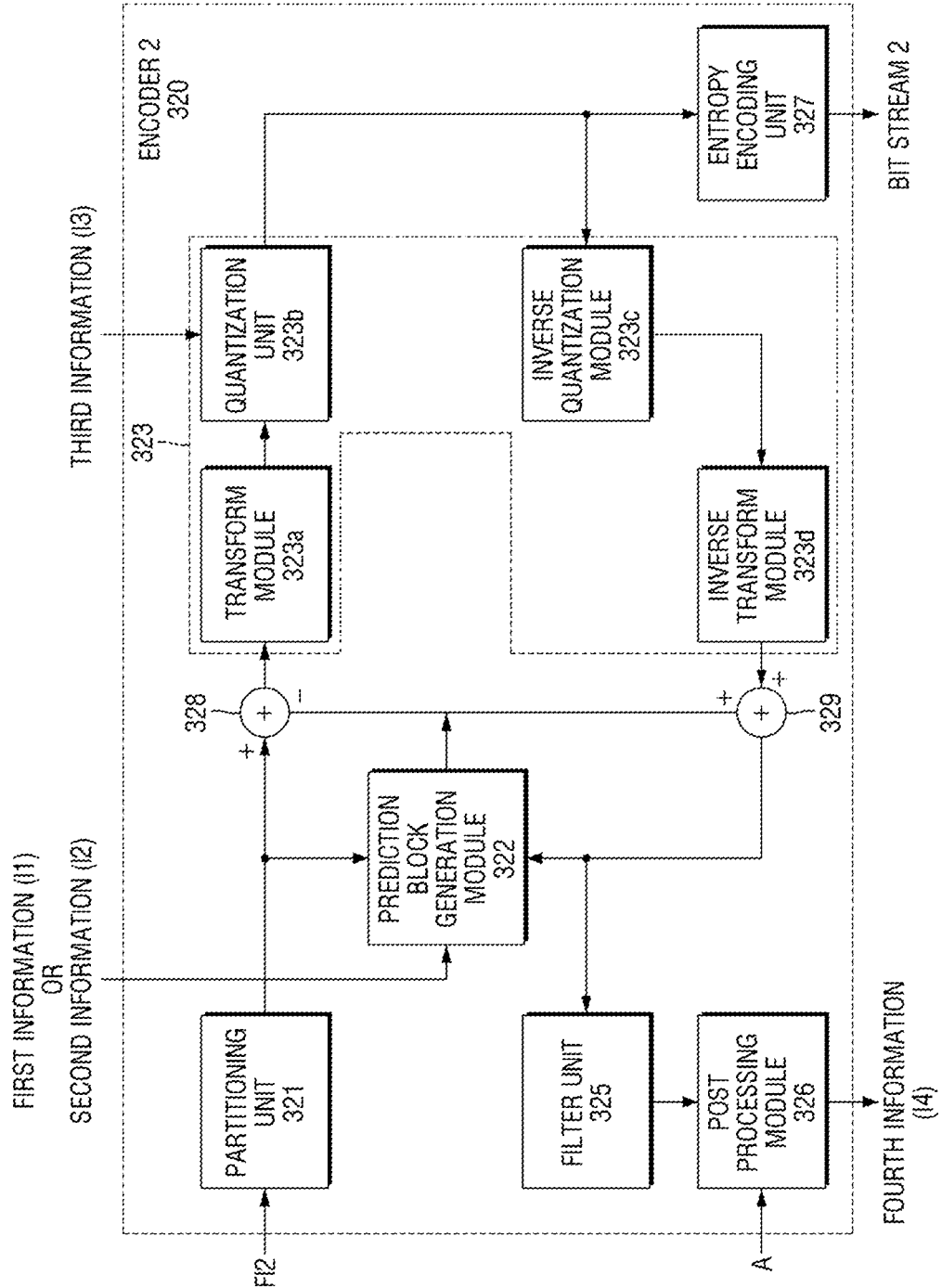
FIG. 5 is a block diagram illustrating another example of the second encoder included in the video encoding system of FIG. 1.

FIGS. 3 through 5 are block diagrams illustrating examples of the second encoder included in the video encoding device of FIG. 1.

Referring to FIG. 3, the second encoder 320 may be a field programmable gate array (FPGA), an Application Specific Integrated Circuit (ASIC), a System-on-Chip (SoC) that includes processing circuitry corresponding to a partitioning unit 321, a prediction block generation module 322, a compression module 323, a filter unit 325, a post-processing module 326, an entropy encoding unit 327, a subtractor 328, and an adder 329.

The elements illustrated in FIG. 3 are not all necessarily essential for realizing the first encoder 310, and the second encoder 320 may include more elements or fewer elements than what is illustrated in FIG. 3.

The partitioning unit 321 may partition the second frame F2, which is included in the third data FI2, into a plurality of blocks. The second frame F2 may be the frame subsequent to the first frame F1 encoded by the first encoder 310.

The second encoder 320, unlike the first encoder 310 of FIG. 2, may not include the processing circuitry corresponding to a prediction module (e.g., the prediction module 312 of FIG. 2). Instead, the second encoder 320 may include the prediction block generation module 322.

The prediction block generation module 322 may receive the first information I1 or the second information I2 from the first encoder 310 and may generate a prediction block.

The second frame F2 is the frame subsequent to the first frame F1 and is thus highly likely to be similar to the first frame F1. Thus, the second encoder 320 can generate a prediction block, without the aid of an intra prediction module or a motion estimation module, simply by sharing, with the first encoder 310, information generated by the first encoder 310 in the process of performing intra prediction or motion estimation on the first frame F1.

For example, in a case where the first information I1 regarding motion estimation, including at least one of information on blocks that have been subjected to motion estimation (for example, the size and number of blocks that have been subjected to motion estimation), information on a motion estimation mode used, information on a reference frame, and motion vector information, is received from the first encoder 310, the prediction block generation module 322 may generate a prediction block by performing motion compensation on a plurality of blocks included in the second frame F2 based on the first information I1.

In another example, in a case where the second information I2 regarding intra prediction, including at least one of information on blocks that have been subjected to intra prediction (for example, the size and number of blocks that have been subjected to intra prediction), information on an intra prediction mode used, and information on a reference frame, is received from the first encoder 310, the prediction block generation module 322 may generate a prediction block for each of the blocks included in the second frame F2 based on the second information I2.

In general, a motion estimation module has a largest size in a typical encoder. Thus, the size of the second encoder 320 can be considerably reduced by not providing a motion estimation module and an intra prediction module in the second encoder 320. As a result, an image can be encoded at a high frame rate using multiple encoders while minimizing the size of an encoding device.

In some example embodiments, only the motion estimation module 312a of FIG. 2 may not be provided in the second encoder 320. In this case, the prediction block generation module 322 can perform intra prediction, but not inter prediction. Thus, the prediction block generation module 322 may receive only the first information I1 from the first encoder 310.

The subtractor 328 may generate a residual block based on the difference between a current block of the second frame F2 that is currently being encoded and the prediction block generated by the prediction block generation module 322. The residual block may be a block indicating the difference between the current block of the second frame F2 and the prediction block.

The compression module 323 may include a transform module 323a, a quantization unit 323b, an inverse quantization module 323c, and an inverse transform module 323d.

The transform module 323a may form block data transformed from the residual block. The transform module 323a may use DCT or wavelet transform. Transform coefficients generated by the transform module 323a may be transmitted to the quantization unit 323b.

In some example embodiments, the quantization unit 323b may receive the third information I3 regarding quantization parameter values determined by the rate control module 314 of the first encoder 310. The quantization unit 323b may adjust the quantization parameter values based on the third information I3 received from the first encoder 310. The quantization unit 323b may quantize the transform coefficients in accordance with the adjusted quantization parameter values and may output the quantized coefficients.

As already mentioned above, the second frame F2 is the frame subsequent to the first frame F1 and is thus highly likely to be similar to the first frame F1. Thus, even if the same quantization parameter values are used, problems are less likely to occur. Accordingly, the size of the second encoder 320 can be reduced by not providing a rate control module in the second encoder 320 and determining the quantization parameter values based on the third information I3 received from the first encoder 310.

Referring to FIG. 4, in some example embodiments, the second encoder 320 may include a rate control module 324. In this case, unlike in the example of FIG. 3, the quantization unit 323b may not receive the third information I3 from the first encoder 310. The rate control module 324 may adjust the quantization parameter value of each of a plurality of blocks included in a current frame using the prediction block. The quantization unit 323b may quantize the transform coefficients in accordance with the quantization parameter values determined by the rate control module 324 and may output the quantized coefficients. All the elements of the second encoder 320 of FIG. 4, except for the rate control module 324, are the same as their respective counterparts of the second encoder 320 of FIG. 3, and thus, detailed descriptions thereof will be omitted.

Referring again to FIG. 3, the quantized coefficients may be inversely quantized by the inverse quantization module 323c and may be inversely transformed by the inverse transform module 323d. The inversely quantized and inversely transformed coefficients may be added to the prediction block by the adder 329, thereby generating reconstructed blocks.

The reconstructed blocks may be filtered through the filter unit 325. The filter unit 325 may apply at least one of a deblocking filter, a SAO filter, and an ALF to the reconstructed blocks. The reconstructed blocks filtered through the filter unit 325 may be transmitted to the post-processing module 326.

The post-processing module 326 may receive the reconstructed blocks and may reconstruct a frame. The post-processing module 326 may compare the reconstructed frame with the second frame F2 encoded by the second encoder 320. If the result of the comparison shows a quality deterioration, the post-processing module 326 may transmit fourth information I4 indicating that a quality deterioration has occurred to the processor 130 of FIG. 1. The post-processing module 326 may determine that a quality deterioration has occurred if the difference between the reconstructed frame and the second frame F2 exceeds a predefined level.

Referring to FIG. 5, the post-processing module 326 may receive a plurality of blocks A via the first encoder 310 and may generate a third frame. The plurality of blocks A may be blocks obtained by partitioning the first frame F1 via the partitioning unit 311 of FIG. 2 or may be blocks reconstructed by the filter unit 316 of FIG. 2. The post-processing module 326 may generate a fourth frame using reconstructed blocks received via the filter unit 325 of FIG. 5.

The post-processing module 326 may compare the third and fourth frames and may determine that a quality deterioration has occurred if the difference between the third and fourth frames exceeds the desired (or, alternatively, the predefined) level. In a case where the post-processing module 326 determines that a quality deterioration has occurred, the post-processing module 326 may transmit fourth information I4 indicating that a quality deterioration has occurred to the processor 130.

All the elements of the second encoder 320 of FIG. 5, except for the rate control module 324, are the same as their respective counterparts of the second encoder 320 of FIG. 3, and thus, detailed descriptions thereof will be omitted.

In some example embodiments, in a case where the fourth information I4 indicating that a quality deterioration has occurred is received, the processor 130 may reallocate frames to the first and second encoders 310 and 320. This will be described later with reference to FIGS. 6 through 8.

Referring again to FIG. 3, the entropy encoding unit 327 may entropy-encode symbols according to a probability distribution based on values calculated by the quantization unit 323b or coding parameter values calculated during encoding and may thus output a second bit stream "BIT STREAM 2". Entropy encoding is a method of receiving symbols having various values and expressing the symbols as a decodable binary sequence while eliminating statistical redundancy.

When entropy encoding is applied, the size of a bit stream for symbols to be encoded can be reduced by allocating a small number of bits to symbols having a high probability of occurrence and a large number of bits to symbols having a low probability of occurrence. Accordingly, the compression performance of video encoding can be enhanced through entropy encoding.

For entropy encoding, a coding method such as exponential Golomb, CAVLC, or CABAC may be used. For example, a table for performing entropy encoding, such as a VLC table, may be stored in the entropy encoding unit 327, and the entropy encoding unit 327 may perform entropy encoding using the stored VLC table. Also, the entropy encoding unit 327 may derive a binarization method of a target symbol and a probability model of a target symbol/bin and may then perform entropy encoding using the derived binarization method or probability model.

Figure 6:
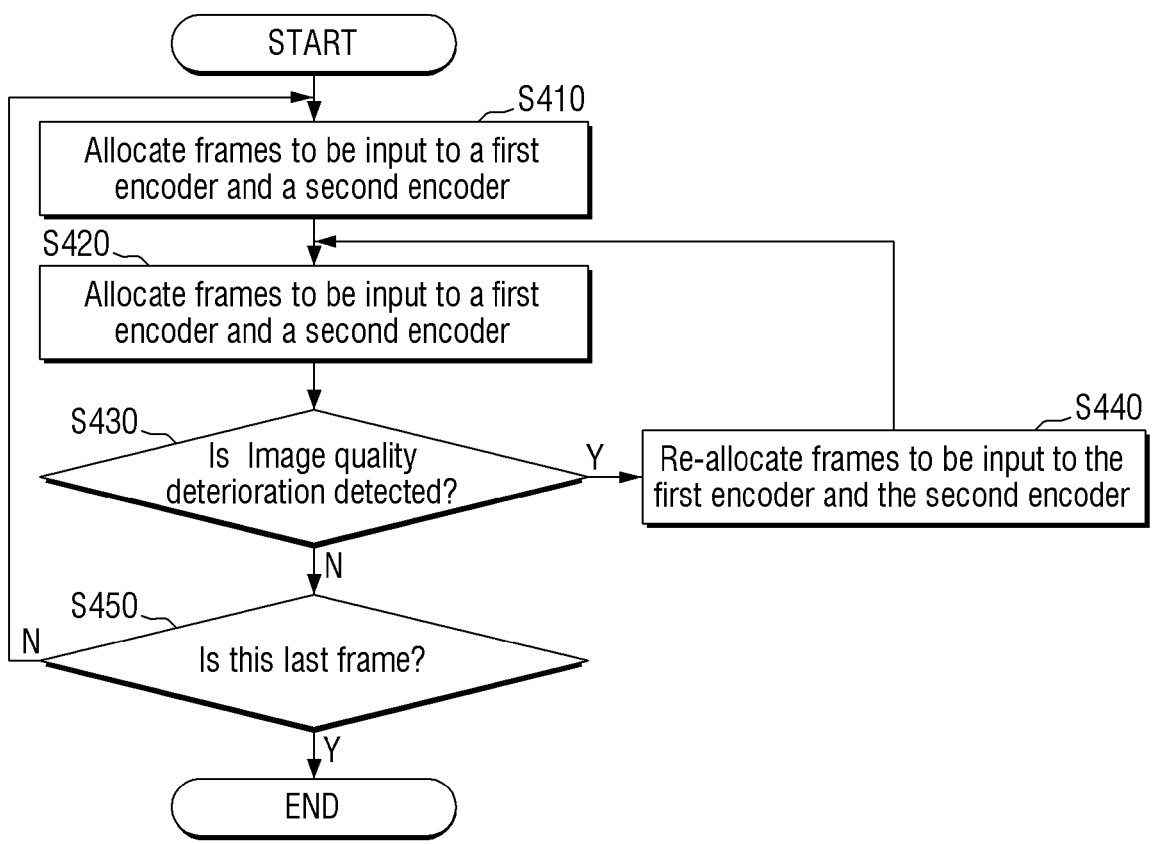
FIG. 6 is a flowchart illustrating a method of reallocating frames input to the first and second encoders in response to a quality deterioration being detected in a video encoding apparatus according to some example embodiments of the present disclosure.
Figure 7:
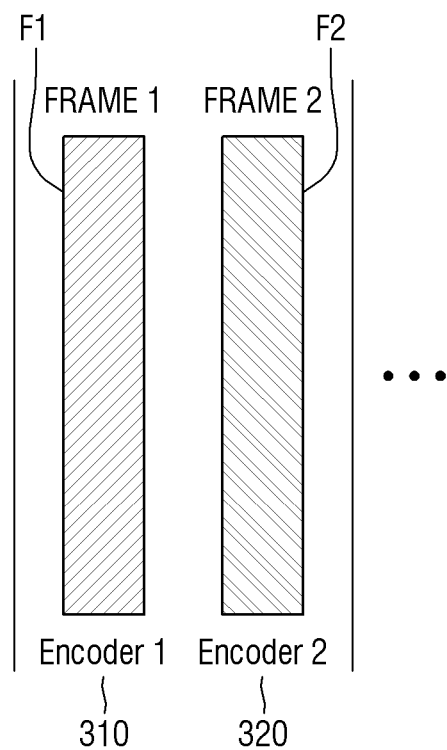
FIG. 7 is a diagram illustrating the method of reallocating frames input to the first and second encoders in response to a quality deterioration being detected in the video encoding apparatus according to some example embodiments of the present disclosure.
Figure 8:
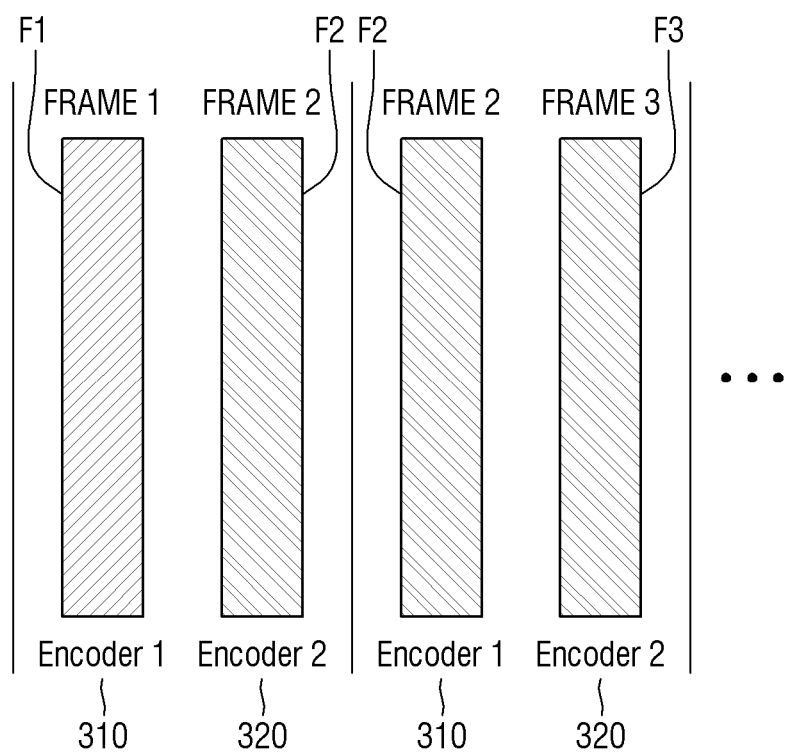
FIG. 8 is a diagram illustrating the method of reallocating frames input to the first and second encoders in response to a quality deterioration being detected in the video encoding apparatus according to some example embodiments of the present disclosure.

FIG. 6 is a flowchart illustrating a method of reallocating frames input to the first and second encoders in response to a quality deterioration being detected in a video encoding apparatus according to some example embodiments of the present disclosure, and FIGS. 7 and 8 are diagrams illustrating the method of reallocating frames input to the first and second encoders in response to a quality deterioration being detected in the video encoding apparatus according to some example embodiments of the present disclosure.

The method of reallocating frames input to the first and second encoders in response to a quality deterioration being detected in the video encoding apparatus according to some example embodiments of the present disclosure will hereinafter be described, avoiding any redundant descriptions of the example embodiments of FIGS. 1 through 5.

Referring to FIG. 6, in operation S110, the processor 130, which is included in the video encoding device 100 of FIG. 1, may allocate frames input to the first and second encoders 310 and 320 of FIG. 3.

For example, in a case where input data includes a plurality of frames, the processor 130 may allocate the plurality of frames in such a manner that odd-numbered frames are input to the first encoder 310 and even-numbered are input to the second encoder 320. If the plurality of frames are allocated between the first and second encoders 310 and 320 in a manner such that different frames are allocated to different ones of the first and second encoders 310 and 320, the frame rate of a video encoding device may be increased.

For example, referring to FIG. 7, the processor 130 may allocate the first frame F1 to the first encoder 310 and may allocate the second frame F2, which is the frame subsequent to the first frame F1, to the second encoder 320.

Referring again to FIG. 6, in operation S420, the first and second encoders 310 and 320 may encode the frames allocated thereto.

In operation S430, the post-processing module 326, which is included in the second encoder 320, may detect a quality deterioration.

As already discussed above with reference to FIGS. 1 through 5, a prediction module performing intra prediction or inter prediction may not be provided in the second encoder 320. Instead, the second encoder 320 may receive information regarding intra prediction or inter prediction from the first encoder 310 and may generate a prediction block.

Referring to FIG. 7, if the second frame F2 encoded by the second encoder 320 differs from the first frame F1 encoded by the first encoder 310 (for example, if the brightness of the second frame F2 differs from the brightness of the first frame F1 or if the motion vector of the second frame F2 differs from the motion vector of the first frame F1), a quality deterioration may occur in a frame decoded by the second encoder 320.

A method in which the post-processing module 326 recognizes a quality deterioration has already been described above with reference to FIGS. 3 and 5, and thus a detailed description thereof will be omitted.

Referring again to FIG. 6, if the post-processing module recognizes a quality deterioration (S430, Y), in operation S440, the post-processing module 326 may transmit information indicating that a quality deterioration has been recognized to the processor 130.

For example, referring to FIG. 8, if information indicating that a quality deterioration has occurred is received from the post-processing module 326, the processor 130 may reallocate the second frame F2 to the first encoder 310 when the encoding of the first frame F1 by the first encoder 310 is complete, and may allocate the third frame F3, which is the frame subsequent to the second frame F2, to the second encoder 320. That is, when the encoding of the first frame F1 by the first encoder 310 is complete, the processor 130 may allocate an even-numbered frame to the first encoder 310 and may allocate an odd-numbered frame to the second encoder 320. That is, the processor 130 may change how to allocate frames after the detection of a quality deterioration.

Referring again to FIG. 6, the first encoder 310 may encode the second frame F2 reallocated thereto, and the second encoder 320 may encode the third frame F3 allocated thereto. The first encoder 310, unlike the second encoder 320, may include a prediction module. Thus, a quality deterioration that has occurred in the second frame F2 can be addressed by re-encoding the second frame F2 in the first encoder 310.

In some example embodiments, if a quality deterioration is detected by the post-processing module 326, the processor 130 may delete the second bit stream "BIT STREAM 2" generated by the second encoder 320, instead of storing or transmitting it.

If the post-processing module 326 does not recognize a quality deterioration (S430, N), in operation S450, the processor 130 may determine whether the frame encoded by the first encoder 310 or the second encoder 320 is the last frame.

If the frame encoded by the first encoder 310 or the second encoder 320 is the last frame (S450, Y), video encoding may be finished. On the other hand, if the frame encoded by the first encoder 310 or the second encoder 320 is not the last frame (S450, N), the processor 130 may repeat operations S410, S420, S430, S440, and S450 on the subsequent frames.

Example embodiments of the present disclosure have been described with reference to the attached drawings, but it may be understood by one of ordinary skill in the art that the present disclosure may be performed one of ordinary skill in the art in other specific forms without changing the technical concept or essential features of the present disclosure. Further, the above-described example embodiments are merely examples and do not limit the scope of the rights of the present disclosure.

What is claimed is:

1. A video encoding device comprising:
a first encoder including prediction circuitry, the prediction circuitry configured to,
perform motion estimation by performing one or more of an intra prediction operation and an inter prediction operation on a plurality of first blocks included in a first frame, and
transmit first information regarding a motion estimation operation, if the prediction circuitry performs the inter prediction operation on the first blocks;
a second encoder including prediction block generation circuitry lacking the prediction circuitry to independently perform the motion estimation such that a size of the second encoder is less than a size of the first encoder, the prediction block generation circuitry configured to, receive the first information from the first encoder, and generate a prediction block for a second frame by performing a motion compensation operation on a plurality of second blocks included in the second frame based on the first information associated with the first frame without independently performing the one or more of the intra prediction operation and the inter prediction operation, the first frame and the second frame being consecutive ones of a plurality of frames included in an input; and a processor configured to allocate the first frame and the second frame in parallel to the first encoder and the second encoder, respectively.

2. The video encoding device of claim 1, wherein the first information includes at least one of information on blocks that have been subjected to the motion estimation operation, information on a mode of the motion estimation operation, information on a reference frame, and motion vector information.

3. The video encoding device of claim 1, wherein the prediction circuitry is configured to transmit second information regarding the intra prediction operation to the second encoder, if the first encoder performs the intra prediction operation, and the prediction block generation circuitry is configured to receive the second information, and to generate the prediction block for the second blocks included in the second frame based on the second information without performing the inter prediction operation directly using prediction circuitry.

4. The video encoding device of claim 3, wherein the second information includes at least one of information on blocks that have been subjected to the intra prediction operation, information on a mode of the intra prediction operation, and information on a reference block.

5. The video encoding device of claim 1, wherein the first encoder further includes rate control circuitry, the rate control circuitry configured to determine quantization parameter values of the first blocks, and the second encoder further includes compression circuitry, the compression circuitry including a quantization unit configured to receive third information, and to perform a quantization operation, the third information being associated with the quantization parameter values of the first blocks.

6. The video encoding device of claim 1, wherein the first encoder further includes a first rate control circuitry, the first rate control circuitry configured to determine quantization parameter values of the first blocks, and the second encoder further includes a second rate control circuitry, the second rate control circuitry configured to determine quantization parameter values of the second blocks.

7. The video encoding device of claim 1, wherein the second encoder is configured to transmit fourth information to the processor, if a quality deterioration is detected from a reconstructed frame obtained by inversely quantizing data encoded by the second encoder.

8. The video encoding device of claim 7, wherein if the processor receives the fourth information, the processor is configured to, reallocate the second frame from the second encoder to the first encoder when the first encoder completes encoding of the first frame, and allocate a third frame to the second encoder, the third frame being a frame subsequent to the second frame.

9. An encoder configured to communicate with a processor such that the encoder and a first encoder separate from the encoder are allocated a second frame and a first frame, respectively, in parallel by the processor, the encoder configured to encode the second frame without having prediction circuitry configured to perform one or more of an intra prediction operation and an inter prediction operation, the encoder comprising:

prediction block generation circuitry configured to receive first information and second information from the first encoder, the first information including motion estimation information associated with a motion estimation operation performed by the first encoder on the first frame and the second information including intra prediction information associated with the intra prediction operation performed by the first encoder on the first frame, the first encoder being different from the encoder, and to generate a prediction block associated with the second frame based on the motion estimation information and the intra prediction information associated with the first frame without independently performing the one or more of the intra prediction operation and the inter prediction operation for the second frame; and post-processing circuitry configured to detect a quality deterioration based on a reconstructed frame and the second frame, the reconstructed frame being obtained by inversely quantizing data encoded by the encoder, wherein the encoder lacks the prediction circuitry to independently perform the motion estimation such that a size of the encoder is less than a size of the first encoder that includes the prediction circuitry.

10. The encoder of claim 9, wherein the first information is information regarding the motion estimation operation performed by the first encoder on the first frame, and the first frame and the second frame are consecutive ones of a plurality of frames included in an input.

11. The encoder of claim 10, wherein the first information includes at least one of information on blocks that have been subjected to the motion estimation operation, information on a mode of the motion estimation operation, information on a reference frame, and motion vector information.

12. The encoder of claim 9, wherein the second information is information regarding the intra prediction operation performed by the first encoder on the first frame, and the first frame and the second frame are consecutive ones of a plurality of frames included in an input.

13. The encoder of claim 12, wherein the second information includes at least one of information on blocks that have been subjected to the intra prediction operation, information on a mode of the intra prediction operation, and information on a reference block.

14. The encoder of claim 9, wherein the post-processing circuitry is configured to detect that the quality deterioration has occurred if a difference between the first frame and the reconstructed frame exceeds a defined level.

15. A video encoding device comprising:

a first encoder including prediction circuitry configured to perform motion estimation;

a second encoder, the second encoder being different from the first encoder such that the second encoder lacks the prediction circuitry to independently perform the motion estimation such that a size of the second encoder is less than a size of the first encoder; and a processor configured to,
  allocate a first frame and a second frame in parallel to the first encoder and the second encoder, respectively, the first frame and the second frame being different ones of a plurality of frames included in an input such that the second frame is a frame subsequent to the first frame, and
  if a quality deterioration is detected from an image encoded by the second encoder, the processor is configured to,
    reallocate the second frame to the first encoder after the first encoder completes encoding of the first frame, and
    allocate a third frame to the second encoder, the third frame being a frame subsequent to the second frame.

16. The video encoding device of claim 15, wherein the prediction circuitry included in the first encoder is configured to,
  perform the motion estimation by performing one or more of an intra prediction operation and an inter prediction operation on a plurality of first blocks included in the first frame,
  transmit first information to the second encoder, if the first encoder performs the inter prediction operation on the first blocks, the first information being associated with a motion estimation operation, and
  transmit second information to the second encoder, if the first encoder performs the intra prediction operation on the first blocks, the second information being associated with the intra prediction operation.

17. The video encoding device of claim 16, wherein the second encoder is configured to receive one or more of the first information and the second information from the first encoder, and the second encoder comprises:
  prediction block generation circuitry lacking the prediction circuitry to independently perform the motion estimation, the prediction block generation circuitry configured to generate a prediction block for a plurality of second blocks included in the second frame based on one or more of the first information and the second information.

18. The video encoding device of claim 15, wherein the second encoder is configured to transmit fourth information to the processor, if the second encoder detects the quality deterioration in the second frame.

19. The video encoding device of claim 18, wherein the processor is configured to determine that the quality deterioration has occurred, if the processor receives the fourth information.

* * * * *